Sept. 27, 1960

A. O. ZACUR 2,954,219

SCREW WEDGE BURSTER

Filed Feb. 28, 1958

INVENTOR:
ALEX O. ZACUR

BY Charles F. Osgood

ATTORNEY

United States Patent Office 2,954,219
Patented Sept. 27, 1960

2,954,219

SCREW WEDGE BURSTER

Alex O. Zacur, Indiana, Pa., assignor to Joy Manufacturing Company, Pittsburgh, Pa., a corporation of Pennsylvania Filed Feb. 28, 1958, Ser. No. 718,355

6 Claims. (Cl. 262—9)

This invention relates to a mineral dislodging mechanism and more particularly to a mechanical screw wedge material core bursting cone device which rapidly advances into the material core as determined by cone rotation and thread lead each time the core has built up.

In a wedge cone device fixed to the shaft of and dependent on the rate of advance of a hole developing tool, the cone ordinarily wears a seat in the material before developing sufficient radial force to fracture the surrounding core of material. This not only consumes excess power but also produces an undesired higher percentage of material fines.

It is therefor a major object of the present invention to provide a threaded wedge cone material core bursting means so mounted with respect to a hole developing tool and with respect to the core developing means as to permit core build up before forcibly engaging and then rapidly advancing into and bursting the core as determined by cone rotation and the lead of the cone thread.

Another object of this invention is to provide a circular core cutting head provided with an aligned spiral conveyor and a drill arranged centrally of the core cutting head with a screw wedge cone non-rotatably, freely axially slidably mounted on the drill shaft.

A further object is to provide for a threaded wedge cone means non-rotatably, freely axially slidably mounted on a drill shaft which may advance rapidly through a material core, bursting as it goes, as determined by the rate of cone rotation and the lead of the cone thread from a rearmost idle position to a forward position in abutment with the rear of the drill head and then drifting back idling as the material core builds up till forced into the material core again from the rearmost idle position.

Another object is for rapid advance of the threaded wedge cone into the material as determined by the lead of the wedge cone thread and the speed of cone rotation in repeated cycles as determined by core build up rather than at the rate of drill feed to efficiently utilize wedging forces of the cone by sharp, fast wedging and effective shock shattering of core material with a lower overall consumption of power.

Further objects and advantages will appear from the following description and the claims when read in conjunction with the attached drawings, wherein:

Figure 1:
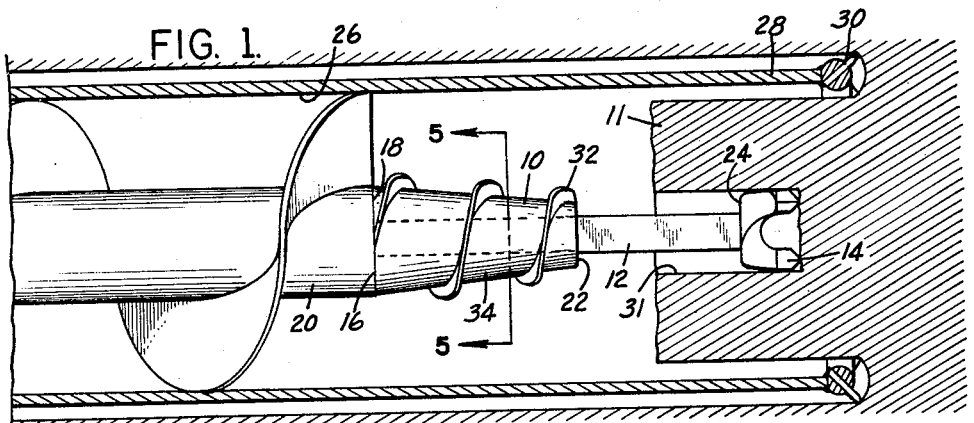
Figure 1 is a sectional side view showing my improved core bursting threaded cone wedge which is non-rotatably, slidably mounted on the shaft of a drill in its rearmost idle position as the core is being built up by a circular core cutting head which has a spiral conveyor.

Referring to the figures my improved threaded wedge cone 10, which repeatedly bursts material of the core 11 after each successive core 11 build up, is non-rotatably, slidably supported on the rectangular shaft 12 of drill 14 for longitudinal axial sliding thereon between a rearmost position such as shown in Figure 1 with the back 16 of the threaded wedge cone 10 in abutment with the front 18 of a spiral conveyor structure 20 to a forwardmost advance position with the front 22 of threaded wedge cone 10 in abutment with the rear 24 of drill 14. Spiral conveyor structure 20 is operatively contained within tube 26, the forward portion 28 of which extends forward to circular core cutting head 30.

Figure 2:
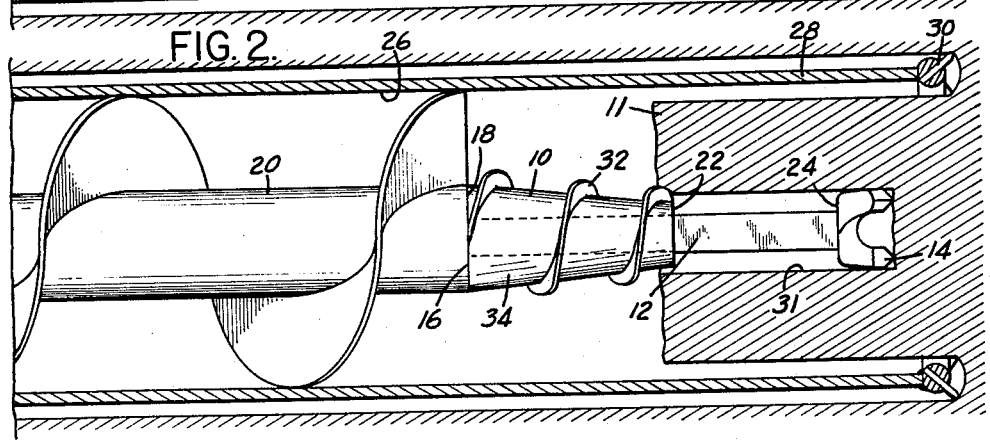
Figure 2 is a sectional side view similar to Figure 1 with the threaded wedge cone still in the rearmost idle position but with the maximum core build up just as the threaded wedge cone is to be forced into the core.
Figure 3:
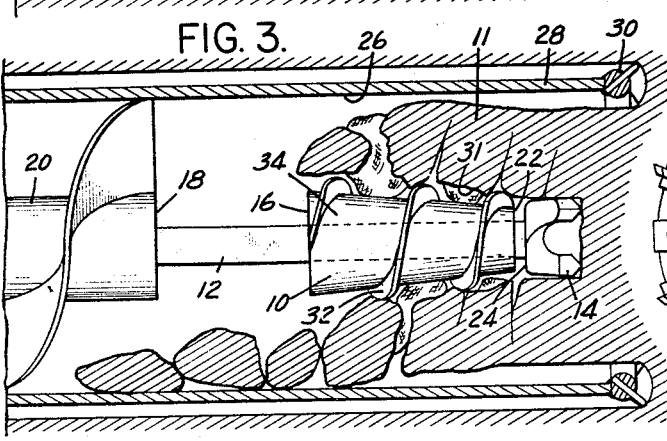
Figure 3 is also a sectional side view, however, with the threaded wedge cone rapidly advancing in a material core, bursting as it goes, as determined by speed of rotation and the lead of the threads as it approaches its forwardmost position abutting the rear of the drill head.
Figure 4:
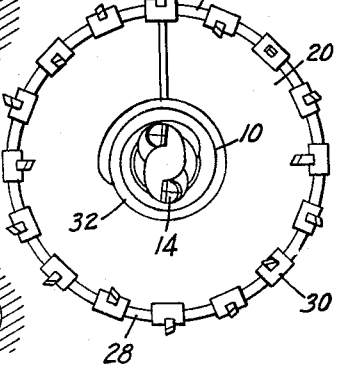
Figure 4 is a front view of the core cutting, drilling and threaded wedge cone material burster of Figures 1, 2 and 3.
Figure 5:
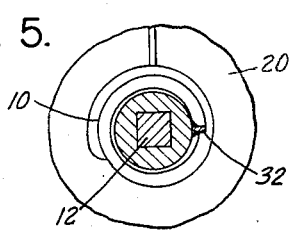
Figure 5 is a partial cut away and sectioned view taken along line 5—5 of Figure 1 showing the non-rotatable, slidable relation between the drill shaft and the threaded wedge cone material burster.

Circular core cutting head 30 cuts a circular core 11 as it is rotated and advanced. Drill 14, the rectangular shaft 12 of which is arranged centrally of cutting head 30 with rectangular shaft 12 extending along the longitudinal rotational axis of spiral conveyor structure 20, tube 26 and the head 30 bores a center opening 31 in each core 11 as it develops at the same rate as the core cutting head 30 is advanced. When the core 11 is developed to the degree shown in Figure 2, threads 32 are made to bite into the core material along center opening 31. As threads 32 are made to grip core material, they pull threaded wedge cone 10 rapidly forward as determined by the speed of rotation of shaft 12 and threaded wedge cone 10 and by the lead of thread 32. This rapid advance of threaded wedge cone 10 into the core opening 31 behind drill 14 bursts the core material outward and into lumps because of the wedging action of the rearwardly increasing diameter progressive cone slope 34 as indicated in Figure 3.

After the threaded wedge cone 10 has reached the forwardmost advance position in each core bursting cycle, the thread 32 breaks free of core material and cone 10 drifts back idling as the material core 11 builds up again. This material core 11 build up continues until threaded wedge cone 10 is again forced into core 11 from the rearmost position as in Figure 2. Rapid advance of threaded wedge cone 10 into core 11 efficiently utilizes wedging forces of the cone 10 by sharp fast wedging and effective shock shattering of core material. This efficient use of power through shock shattering of core material during the material bursting advance of cone 10 in each material bursting cycle and idling of the cone 10 the remainder of the time reduces overall power requirements and reduces the percentage of material fines.

I have herein provided an improved mineral dislodging mechanism which utilizes a material core bursting threaded wedge cone which rapidly advances in a material core bursting advance during each cycle and which idles the remainder of the time till the material core builds up for another cycle. I provide a threaded wedge cone the speed of advance of which in bursting core material is determined by the speed of cone rotation and the lead of the cone thread. I also provide that a threaded wedge cone be non-rotatably axially slidably mounted on the drill shaft of a drill that bores a hole in the center of a material core.

While I have shown and described one embodiment of my invention, various changes and modifications may be effected without departing from the spirit and scope of the invention as defined in the appended claims.

What I claim as new and desire to secure by Letters Patent is:

1. In a mineral dislodging mechanism, a drill means for advancing an opening in a mineral core, a drill shaft for said drill means, a cone wedge member non-rotatably and freely axially movably mounted on said drill shaft with the small end toward said drill means, stop means constructed to provide a rearwardmost limit position for said cone wedge member on said drill shaft, abutment of said cone wedge member with the rear of said drill means effective to establish a forwardmost limit position for the cone wedge member on said drill shaft, and means constructed to provide for rapidly advancing said cone wedge member relative to said drill shaft from the rearwardmost to the forwardmost limit position by engagement with the mineral core, said wedge member advancing freely axially along said drill shaft relative to said drill means during the drilling operation.

2. In the mineral dislodging mechanism defined in claim 1 wherein said cone wedge member and the means for rapidly advancing said cone wedge member is constructed and so mounted on said drill shaft as to provide operation wherein each time the drill means is advanced into a mineral core sufficiently far the cone wedge member is forced from said rearwardmost position into the mineral core sufficiently for the cone advancing means to grip the mineral and with rotation of the drill shaft and the cone wedge member pull the cone wedge member rapidly forward to the forwardmost position bursting the mineral core as it goes and then permitting the cone wedge member to drift freely back again to the rearwardmost position relative to said drill shaft as the drill means and drill shaft continue to be advanced.

3. In the mineral dislodging mechanism defined in claim 2, the means for rapidly advancing said cone member comprising spiral threading constructed to advance said cone wedge member relative to said drill means solely by reactive engagement with core mineral as the cone wedge member is rotating with said drill shaft.

4. In a mineral dislodging mechanism, core cutting mechanism for cutting a core from a solid mine vein, means for mounting said core cutting mechanism for rotation, means for rotating said core cutting mechanism, means for feeding said core cutting mechanism toward the working face during the core cutting operation, a core breaker wedge coaxial with said core cutting mechanism and rotated thereby for breaking the core from the mine vein, means for mounting said breaker wedge for free axial floating movement relative to said core cutting mechanism as the latter is fed and rotated, and means on said wedge operative upon engagement with said core for advancing said wedge relative to said core cutting mechanism during the core cutting operation.

5. A mineral dislodging mechanism as set forth in claim 4 wherein said mounting means for said breaker wedge comprises a shaftlike portion extending axially of said mounting means for said core cutting mechanism and on which said wedge is mounted for free axial floating movement.

6. In a mineral dislodging mechanism, drill means for advancing an opening in the mineral, mounting means for said drill means, a cone wedge member non-rotatably freely axially movably mounted on said drill mounting means, and means for advancing said cone wedge member along said drill mounting means in a mineral bursting advance, said means for advancing said cone wedge member comprising threads on the cone wedge member constructed to advance said cone wedge member along said drill mounting means during rotation of the latter and the wedge member by engagement of the threads with the mineral and said wedge member advancing relative to said drill means independently of the rate of advance of the latter during drilling.

References Cited in the file of this patent
UNITED STATES PATENTS

| 1,116,355 | Morgan | Nov. 3, 1914 |
| 2,689,117 | Lindberg | Sept. 14, 1954 |
| 2,738,965 | McCarthy | Mar. 20, 1956 |
| 2,801,093 | Joy | July 30, 1957 |

FOREIGN PATENTS

| 741,904 | Great Britain | Dec. 14, 1955 |